United States Patent [19]

Kacalieff et al.

[11] Patent Number: 4,597,594
[45] Date of Patent: Jul. 1, 1986

[54] HOSE CONNECTOR

[75] Inventors: Christ D. Kacalieff, St. Louis County, Mo.; Charles E. Causey, Granite City, Ill.

[73] Assignee: Chris Kaye Plastics Corp., St. Louis, Mo.

[21] Appl. No.: 794,770

[22] Filed: Nov. 4, 1985

Related U.S. Application Data

[63] Continuation of Ser. No. 530,518, Sep. 9, 1983, abandoned.

[51] Int. Cl.⁴ .............................................. F16L 33/00
[52] U.S. Cl. .................................. 285/239; 285/397; 285/423; 285/259
[58] Field of Search ................. 285/39, 239, 259, 370, 285/397, 423, 240, 4, 23, DIG. 22, DIG. 24, 241, 260, 38, 251, 238; 403/292; 128/1 R, 79, DIG. 25

[56] References Cited

U.S. PATENT DOCUMENTS

| 48,709 | 7/1865 | Emery | 285/257 |
|---|---|---|---|
| 509,458 | 11/1893 | Still | 285/251 |
| 928,237 | 7/1909 | Baird | 285/239 |
| 1,078,957 | 11/1913 | Rinaldo | 285/251 |
| 1,996,855 | 10/1933 | Cheswright | 285/239 |
| 3,667,781 | 6/1972 | Holbrook | 285/240 |
| 3,767,233 | 10/1973 | Hodge | 403/292 |
| 3,957,292 | 5/1976 | Diggs | 285/423 |
| 3,966,339 | 6/1976 | Nemtscek et al. | 403/292 |
| 3,984,133 | 10/1976 | Bird | 285/DIG. 22 |
| 4,454,699 | 6/1984 | Strobl | 403/298 |

FOREIGN PATENT DOCUMENTS

| 684896 | 4/1964 | Canada | 285/239 |
|---|---|---|---|
| 2624241 | 3/1976 | Fed. Rep. of Germany | 285/239 |
| 438250 | 11/1935 | United Kingdom | 285/239 |

Primary Examiner—Cornelius J. Husar
Assistant Examiner—Eric K. Nicholson
Attorney, Agent, or Firm—Gravely, Lieder & Woodruff

[57] ABSTRACT

A connector for joining the ends of flexible hoses comprising a one-piece moldable plastic body of light weight construction with hose engaging barbs at each end and supporting ribs in the midspan between the end barbs for sustaining the wall of the body against internal pressure, the one-piece body being free of the requirement to seal or sonically weld parts in final assembly.

8 Claims, 2 Drawing Figures

HOSE CONNECTOR

This is a continuation of co-pending application Ser. No. 530,518 filed on Sept. 9, 1983, now abandoned.

BACKGROUND OF THE INVENTION

1. Field of the Invention

This invention is directed to an improvement in hose connectors for coupling flexible hoses together.

2. Description of the Prior Art

The art of connecting flexible hoses has involved various devices for insertion in the bore of the flexible hose. In some instances the hose connector has embodied a single metallic body having a central bore and an exterior form in which the ends are tapered to an enlarged midposition, and in which the tapered ends have a series of barb rings which grip the surface of the hose bore and create a labyrinth seal to stop leakage of the medium, such as a gas or a fluid, to be conducted through the hose. It is known that metallic hose connectors are heavy, costly to produce, and require excessive waste of metal in order to form tapered ends for the series of barb rings.

In the place of metallic hose connectors, it is known to form connectors of molded plastic materials in two pieces which have a slip fit to unite the pieces to complete a connector. The two-piece connector requires substantial precision in molding the surface which have the slip fit so that a leakproof joint can be created when the pieces are adhesively joined. The problem with two-piece hose connectors is that the mating of the two parts creates a bulky body which is cylindrical for ease of molding, excessive material is required, and the precision required to make a slip fit adds to the cost of production.

There are several additional types of molded plastic hose connectors, one of which is similar to the foregoing two-piece body with the slip fit, except that the two parts have enlarged flanges which are secured in abutment to make the final form of the connector into a single body hose connector. Another hose connector is made into a single body in which one end set of barbs is larger in diameter than the opposite end set of barbs, and these different barbed ends are connected by a small diameter plain tubular portion. This last hose connector is intended to be used for connecting hoses of different diameters.

BRIEF DESCRIPTION OF THE DISCLOSURE

The objects of the present invention are to provide a hose connector having a configuration that is adapted to low cost injection molding techniques, to overcome the problems in producing a two-piece connector that can be assembled in a leakproof manner, and to allow for increased production with significant reduction in use of material in the final hose connector.

A preferred embodiment of the present hose connector comprises a one-piece injection molded body having a substantially uniform internal bore, tapered end portions formed with a series of barb rings which gradually increase in diameter from ring-to-ring, and at least one midrib having a noncircular periphery so the connector will be prevented from rolling.

Other features and characteristics of the hose connector of this invention will be set forth in the following description.

BRIEF DESCRIPTION OF THE DRAWINGS

The presently preferred embodiment of the invention is disclosed in the following drawings, wherein.

DETAILED DESCRIPTION OF THE EMBODIMENT

Figure 1:
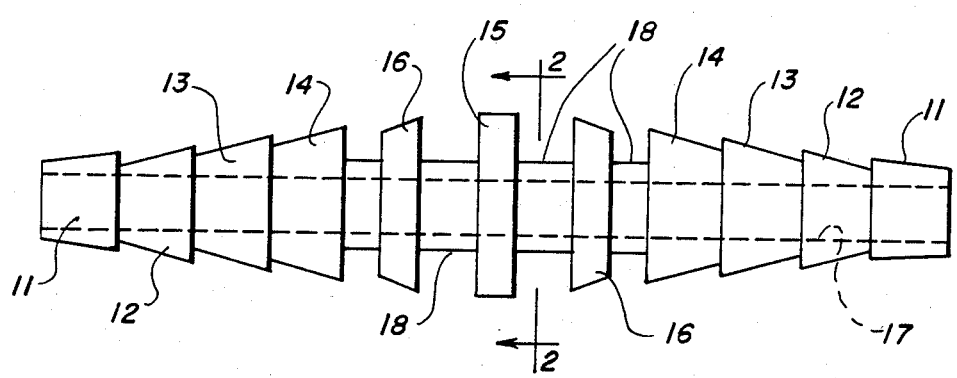
FIG. 1 is a side view of the hose connector to show the tapered configuration imparted to the barbs and the central noncircular rib.
Figure 2:
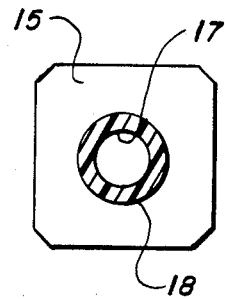
FIG. 2 is a sectional view seen along line 2—2 in FIG. 1 to further show the noncircular configuration of the cental or midrib.

The views in the drawings depict a preferred embodiment for the hose connector which can be produced at low cost and in quantity by injection molding technique with multi-cavity molds. The body of the connector is formed from each end by a series of circular barbs, beginning at the end barbs 11 and continuing toward the midlength with progressively larger circular barbs 12, 13 and 14. There is a larger midring or midrib 15 which has a noncircular form as shown in FIG. 2, and this rib 15 is flanked at each side by slightly smaller rings or ribs 16. The connector body has a substantially constant diameter bore 17 running throughout its length.

A characteristic of the connector can be seen in the arrangement of the series of barb rings 11, 12, 13 and 14 being formed in stacked adjacency so that a secure grip can be created with the interior of a flexibe hose. The series of barb rings are intended to indent into the interior surface of a hose having a flexible wall and form a labyrinth type seal which not only is leakproof for gaseous as well as liquid materials, but establishes a secure connection to resist detachment.

A further characteristic of the connector resides in the formation of the midlocation of the ribs 15 and 16 in spaced relation to reduce the weight of the connector and form support for the wall of the plane tubular portion 18 of the body between the ribs 15 and 16 which has a reduced wall thickness. In addition, the midposition rib 15 has been given a noncircular form so the connector body will not roll if placed on a slope or nonlevel surface before being inserted in a hose. The noncircular form may be a simple rectangle, or a square with clipped corners as seen in FIG. 2, as that appears to be the least expensive to provide.

There are a variety of materials which can be employed for the hose connector. Some can be polypropylene, or nylon, or Acrylonitrile-Butadiene-Styrene resin (ABS), but the essential characteristics is that the material lends itself to injection molding technique which results in a one-piece body of uniform consistency of shape with sufficient strength to withstand internal pressures exerted by the gaseous or liquid media being moved through the hose.

In addition to the characteristics in form of the hose connector body 10, it is to be noted that the provision of the spaced midribs 15 and 16 affords a place where the body can be gripped when being installed or removed from a hose.

In the foregoing description of the hose connector, and with reference to the drawings, it can be appreciated that the connector comprises an elongated one-piece body formed of a moldable plastic material having a substantially uniform diameter internal bore extending from end-to-end of the body with first and second series of barb rings on said body surrounding said bore and extending inwardly from the opposite ends of the body toward the midspan of the length of the body, each series of barb rings including small diameter rings adjacent the ends of the body and progressively increasing diameter rings in adjacency such that the series of the barb rings define axially spaced tapered end portions on said body which become progressively larger in diameter or diverge toward the body midspan which has a uniform external diameter between the barb rings, and means formed on the body in the exposed uniform diameter midspan thereof for providing a support for the midspan wall as well as a finger grip when manipulating the connector on a hose, and wherein the finger grip means include an enlarged rib 15 having a non-circular peripheral shape for preventing the connector body from rolling, and flanking ribs 16. The roll prevention feature of the rib is to make the job of handling the hoses and connector more efficient, especially when the connector must be put down while the hose is being brought into position to receive the connector. The hose connector disclosed in the foregoing specification can be easily understood to accomplish its intended purpose, and provide an extremely simple and low cost connector body which is rugged and capable of making a leak-free connection with the interior of a hose. It is to be understood, however, that the disclosed form for the hose connector is given by way of illustration and not necessarily by way of limitation.

What is claimed is:

1. A connector for connecting pressure fluid conducting hoses having flexible walls, said connector comprising: an axially elongated one-piece molded plastic body having opposite open ends and an internal fluid carrying bore communicating with said opposite ends, said body being continuous around the bore so as to form a leak proof uninterrupted wall around the bore and throughout the elongated body, said body being formed axially inwardly from adjacent its opposite ends with an external series of separately formed barb rings of progressively increasing diameter as measured axially inwardly from the opposite open ends, said increasing diameter of said barb rings imparting a tapering configuration to said body which diverges toward a midposition of said body, and said body being formed in the midposition with a plurality of body encircling rib means arranged in axially spaced relation to expose portions of the wall therebetween, said rib means having diameters which cause said rib means to project outwardly beyond any of said barb rings to provide at least one annular groove for a manual grip for holding said body during insertion and removal of a hose.

2. The connector of claim 1 wherein said plurality of rib means have a minimum of plastic material for reducing the weight of said body.

3. The connector of claim 1 wherein said plurality of rib means include a central rib having a noncircular configuration and flanking ribs axially spaced from said central rib and each having a circular configuration.

4. The connector of claim 1 wherein said plurality of rib means include a central rib having a periphery made up of a plurality of surfaces which project outwardly of said body to provide support for said body against rolling.

5. A connector for use in joining pressure fluid conducting hoses having flexible walls, said connector comprising: an elongated one-piece body formed of a molded plastic material having a substantially uniform diameter internal bore extending from end-to-end of said body and being continuous around the bore so as to form a leak proof wall; a first series of barb rings on and encircling said body and extending axially inwardly from one end; a second series of barb rings on and encircling said body and extending axially inwardly from the opposite end, said first and second series of barb rings ending in spaced relation so as to leave an exposed central length of said body with a uniform diameter midway of the axial length of said body; each series of said barb rings being formed in stacked adjacency so that a secure grip is created with the flexible wall of hoses being joined and a labyrinth seal and secure connection is formed; and means are formed on said body between the spaced ends of said first and second series of barb rings in the uniform diameter central length of said body for providing support means for the central length of said body and a finger grip when manipulating the connector on a hose, said finger grip means being spaced from the first and second series of barb rings such that annular grooves exist between the first and second series of barb rings and the finger grip means, said finger grip means including an enlarged rib having a noncircular peripheral shape for preventing the connector body from rolling and at least one other rib spaced from the enlarged rib so as to create an annular additional groove at the finger grip means.

6. A connector for joining the adjacent ends of pressure fluid conducting hoses having flexible walls, said connector comprising: an elongated one-piece tubular body formed from molded plastic material having a substantially uniform internal bore extending from end-to-end of said body, the body having a wall that is continuous around the bore to provide a leak proof bore; first and second series of barb rings on said body surrounding said internal bore, said series of barb rings extend inwardly from the opposite ends of said body toward the middle of the length of said body, and each series of barb rings having the rings thereof adjacent and progressively increasing in diameter to provide generally tapered opposite end portions on said body which body then becomes progressively larger in diameter toward the middle of the body length; and means formed on said body in the middle of the body length between said first and second series of barb rings for providing a support in the middle length of said body against a pressure fluid conducted through the connector, said support means including an annular rib of a noncircular peripheral shape for preventing said body from rolling and annular flanking ribs, there being a flanking rib beyond each end of the noncircular rib with the flanking ribs being spaced from the noncircular rib and from the barb rings such that annular grooves exist between the flanking ribs and the noncircular rib and between the flanking ribs and the barb rings.

7. The connector set forth in claim 5 wherein said support means in the middle of the body length consists of an enlarged single rib having said noncircular peripheral shape, and a flanking rib on each side of said single rib.

8. The connector set forth in claim 5 wherein said middle length of said one-piece body has a substantially uniform thickness of wall surrounding said internal bore for weight reduction.

* * * * *